(12) United States Patent
Ko et al.

(10) Patent No.: US 9,628,595 B2
(45) Date of Patent: Apr. 18, 2017

(54) SECOND MICROPHONE DEVICE OF A MOBILE TERMINAL

(71) Applicant: Samsung Electronics Co., Ltd., Suwon-si, Gyeonggi-do (KR)

(72) Inventors: Young Jae Ko, Hwaseong-si (KR); Min Seok Kim, Hwaseong-si (KR); Jin Hong Park, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/707,480

(22) Filed: May 8, 2015

(65) Prior Publication Data

US 2015/0244845 A1    Aug. 27, 2015

Related U.S. Application Data

(63) Continuation of application No. 13/527,041, filed on Jun. 19, 2012, now Pat. No. 9,031,620.

(30) Foreign Application Priority Data

Jul. 8, 2011    (KR) .......................... 10-2011-0067639

(51) Int. Cl.
*H04M 1/00* (2006.01)
*H04M 1/02* (2006.01)
*H04M 1/03* (2006.01)
*H04R 1/08* (2006.01)

(52) U.S. Cl.
CPC ............ *H04M 1/0274* (2013.01); *H04M 1/03* (2013.01); *H04R 1/083* (2013.01); *H04R 2410/05* (2013.01); *H04R 2499/11* (2013.01)

(58) Field of Classification Search
CPC ........................... H04W 40/24; H04M 1/0262
USPC ...... 455/569.1, 570, 575.7, 575.1, 418, 563, 455/556.1; 381/381, 119, 361, 58, 91, 381/392, 89, 351, 71.6
See application file for complete search history.

(56) References Cited

U.S. PATENT DOCUMENTS

| | | | |
|---|---|---|---|
| 5,223,660 A | 6/1993 | Wahlgreen | |
| 6,570,992 B1 * | 5/2003 | Folan ...................... | H04M 1/03 379/433.03 |
| 8,290,546 B2 | 10/2012 | Chen et al. | |
| 2002/0051533 A1 * | 5/2002 | Edelist .................... | H04M 1/05 379/441 |
| 2006/0089054 A1 | 4/2006 | Woo | |
| 2008/0167087 A1 * | 7/2008 | Tang ........................ | H04M 1/05 455/569.1 |
| 2008/0273692 A1 | 11/2008 | Buehl | |
| 2009/0110404 A1 | 4/2009 | Agevik | |
| 2010/0092016 A1 | 4/2010 | Iwano et al. | |

(Continued)

*Primary Examiner* — Kiet Doan
(74) *Attorney, Agent, or Firm* — Jefferson IP Law, LLP

(57) ABSTRACT

A second microphone device of a mobile terminal, and more particularly, a second microphone device of a mobile terminal for preventing various limitations caused by mounting of a second microphone, is provided. The second microphone device includes an ear jack connector having an insertion space, a microphone hole connected at one end to the insertion space, and a second microphone connected at the other end of the microphone hole, thereby improving ambient noise removal performance of the mobile terminal without adversely affecting its appearance.

5 Claims, 5 Drawing Sheets

(56) References Cited

U.S. PATENT DOCUMENTS

2011/0002499 A1    1/2011    Hoggarth et al.
2011/0044478 A1    2/2011    Qu

* cited by examiner

SECOND MICROPHONE DEVICE OF A MOBILE TERMINAL

PRIORITY

This application is a continuation application of a prior application Ser. No. 13/527,041 filed on Jun. 19, 2012, which claimed the benefit under 35 U.S.C. §119(a) of a Korean patent application filed on Jul. 8, 2011 in the Korean Intellectual Property Office and assigned Serial No. 10-2011-0067639, the entire disclosure of each of which is hereby incorporated by reference.

BACKGROUND OF THE INVENTION

1. Field of the Invention

The present invention relates to the reduction of ambient noise during a voice conversation using a mobile terminal. More particularly, the present invention relates to a second microphone device of a mobile terminal that enhances the reduction of ambient noise.

2. Description of the Related Art

As mobile terminals become more sophisticated, users expect additional features as well as a high level of call quality. To address the issue of call quality, technologies that include a second microphone for removal of ambient noise are often applied to mobile terminals.

FIG. 1 is a perspective view of a mobile terminal having a second microphone device according to the related art, and FIG. 2 is a perspective view of the mobile terminal of FIG. 1 from a different angle according to the related art.

Referring to FIG. 1 and FIG. 2, a main microphone 102 receives the voice of a user, transforms the received voice to an electrical signal, and transfers the electrical signal. The main microphone 102 is generally installed on the bottom of a mobile terminal 101. A second microphone device 100 is located on the mobile terminal to assist in achieving optimum performance by removing ambient noise other than the user's voice. Therefore, as shown in FIG. 2, the second microphone device 100 is installed on the top of the mobile terminal 101 in a direction opposite to the bottom of the mobile terminal 101 where the main microphone 102 is installed. However, the second microphone device 100 may not be installed on the top of the mobile terminal 101 in some cases, due to an undesirable appearance of the terminal caused by a microphone hole 120 exposed to the outside of the mobile terminal 101 and due to limitations of mounting conditions of the mobile terminal 101. For example, the top of the mobile terminal 101 already includes an ear jack connector 110 for use in connection of an earpiece so that an additional hole for the second microphone 100 is even more unsightly and would require additional processing costs when creating the additional hole.

Accordingly, a second microphone device of a mobile terminal may be embodied in some cases by using a receiver hole 103, which is provided for a speaker that outputs a voice of a corresponding person to the user, or at a rear or side of the mobile terminal. However, in any of these cases, because an object such as an ear, a hand or the face of the user closely contacts a second microphone hole installed in the receiver hole 103 or at the rear or side of the mobile terminal, there may be a problem that ambient noise may not be received by the second microphone device of the mobile terminal, thereby decreasing an ambient noise removal performance.

SUMMARY OF THE INVENTION

Aspects of the present invention are to address at least the above-mentioned problems and/or disadvantages and to provide at least the advantages described below. Accordingly, an aspect of the present invention is to provide a mobile terminal having a second microphone device for removal of ambient noise. Another aspect of the present invention is to provide a mobile terminal having a second microphone device for removal of ambient noise without impairing the appearance of the mobile terminal.

In accordance with an aspect of the present invention, a second microphone device of a mobile terminal is provided. The second microphone device includes an ear jack connector having an insertion space for insertion of an earphone plug, a microphone hole connected at one end to the insertion space, and a second microphone connected at the other end of the microphone hole.

According to the present invention, because a microphone hole of a second microphone is connected to an insertion space into which an earphone plug can be inserted, the appearance of the mobile terminal is not impaired and the removal of ambient noise may be achieved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
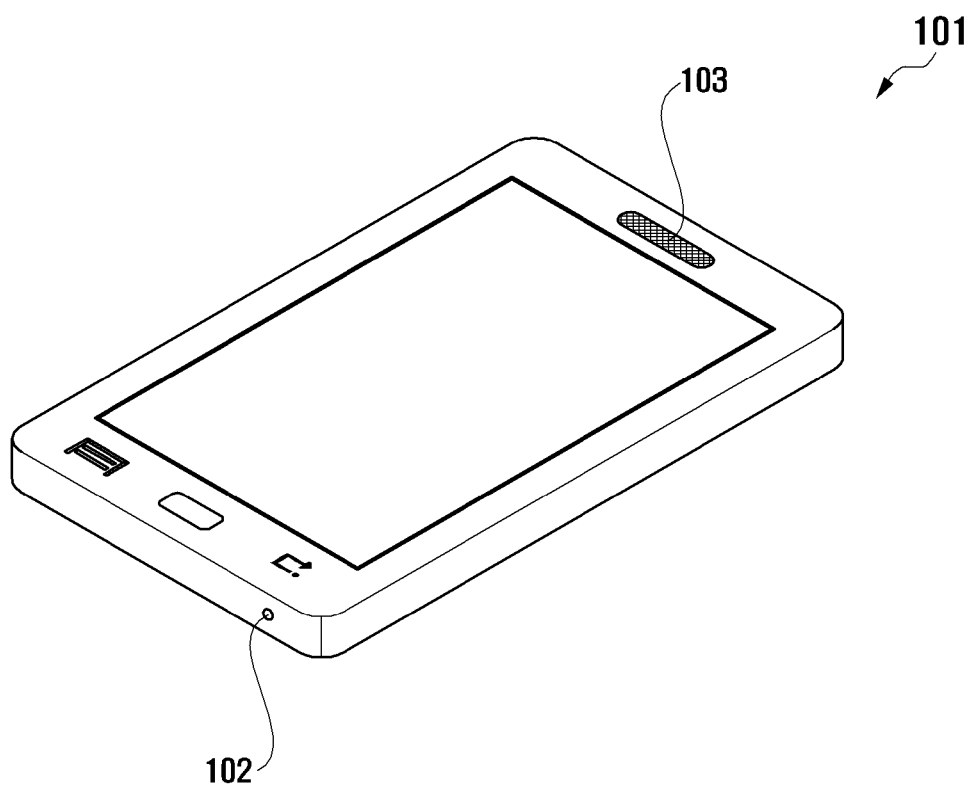
FIG. 1 is a perspective view of a mobile terminal having a second microphone device according to the related art.
Figure 2:
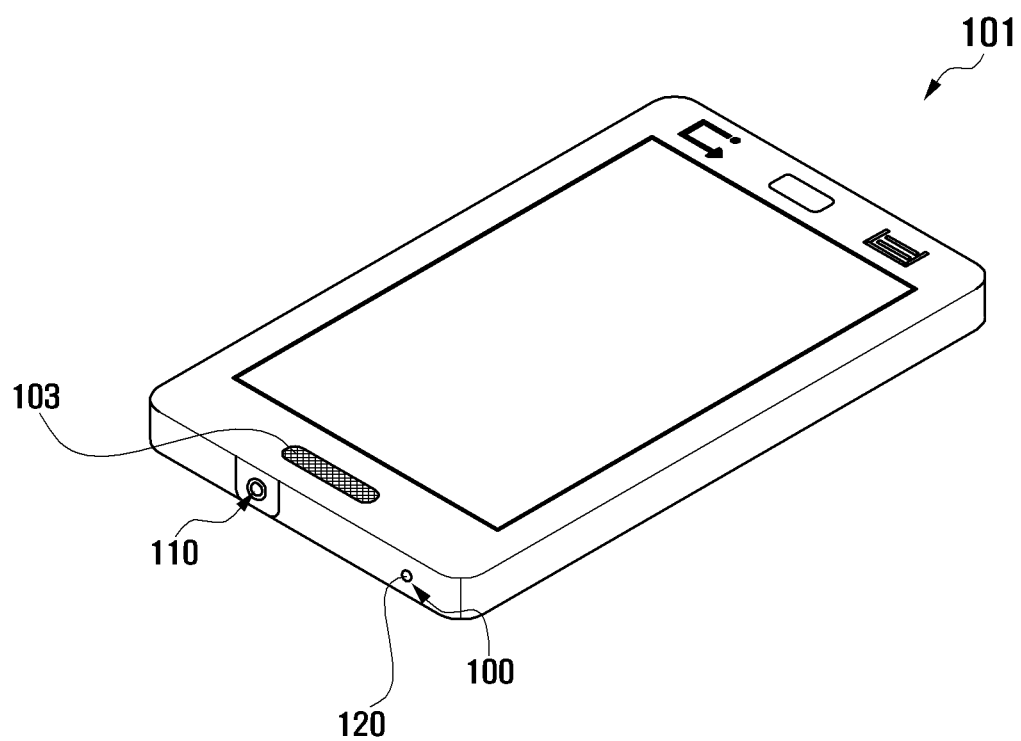
FIG. 2 is a perspective view of the mobile terminal of FIG. 1 from a different angle according to the related art.
Figure 3:
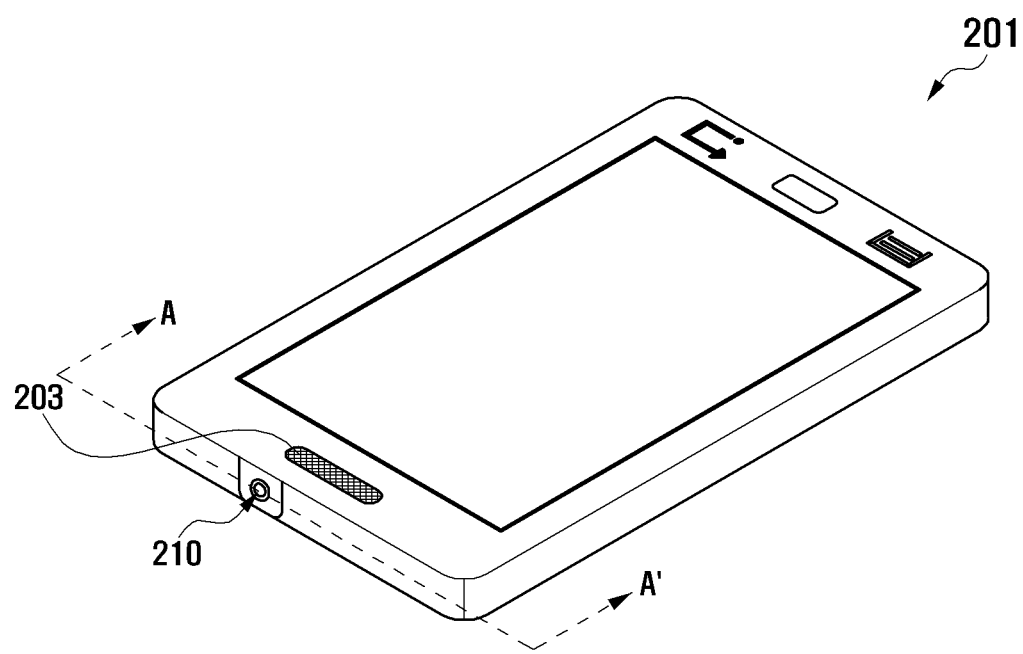
FIG. 3 is a perspective view of a mobile terminal having a second microphone device according to an exemplary embodiment of the present invention.
Figure 4:
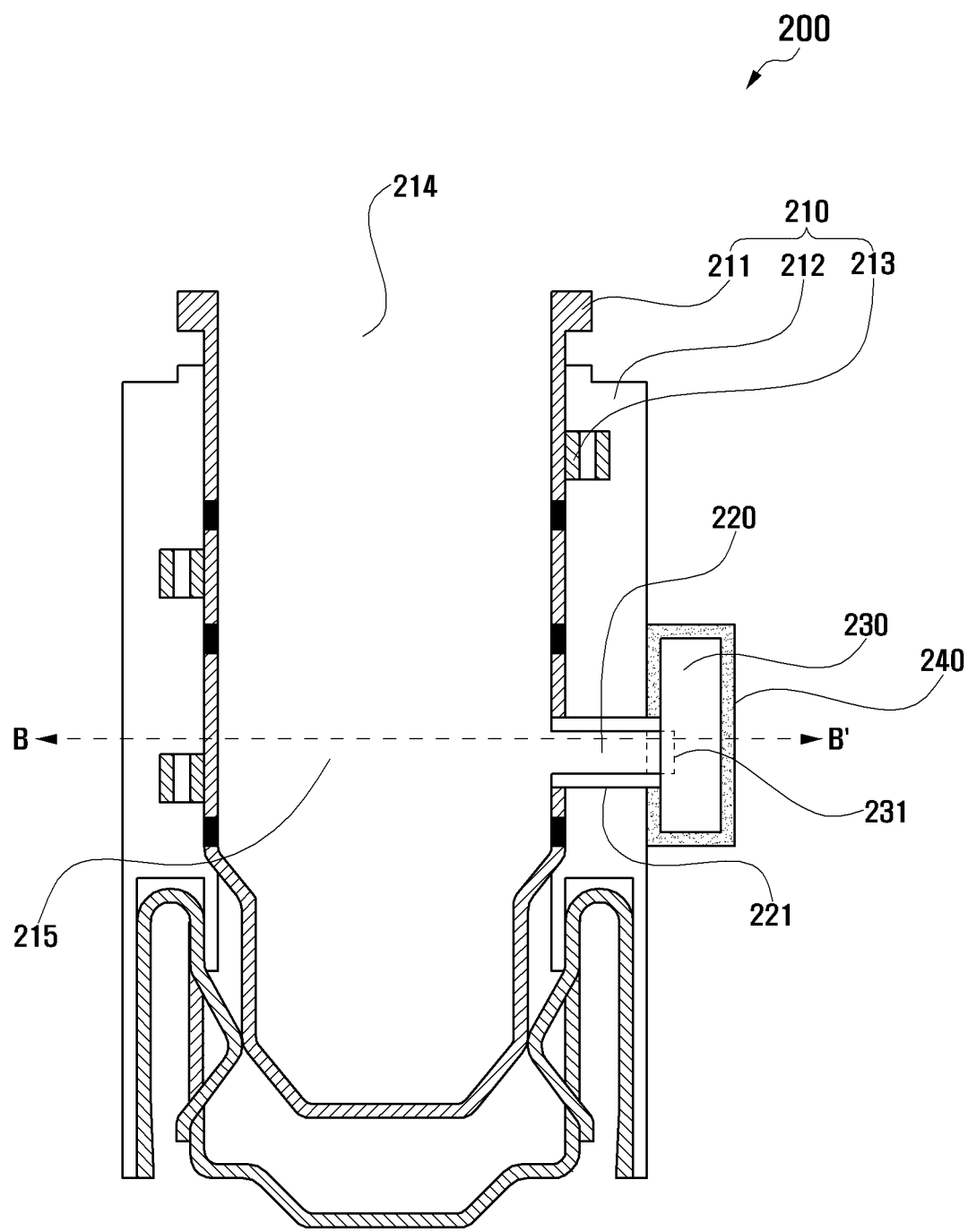
FIG. 4 is a cross-sectional view of the second microphone device cut along the line A-A' in the mobile terminal of FIG. 3 according to an exemplary embodiment of the present invention.
Figure 5:
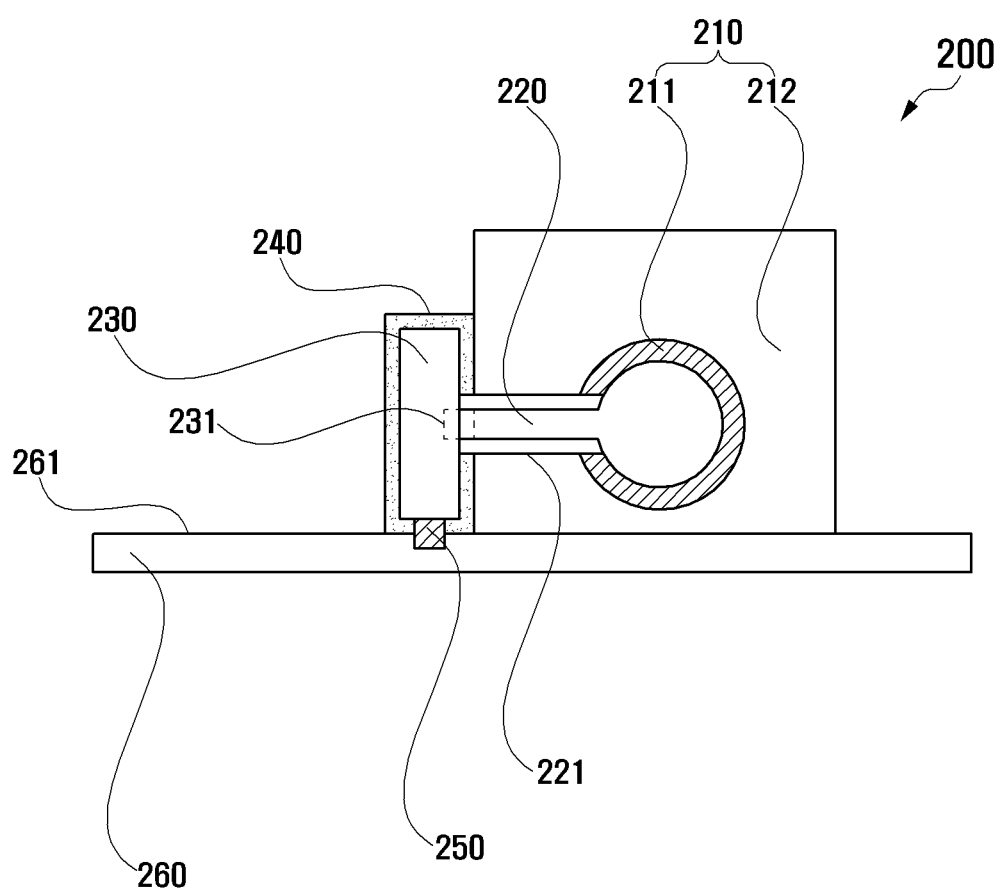
FIG. 5 is a cross-sectional view of the second microphone device cut along the line B-B' in the second microphone device of FIG. 4 according to an exemplary embodiment of the present invention.

FIG. 3 is a perspective view of a mobile terminal having a second microphone device according to an exemplary embodiment of the present invention, FIG. 4 is a cross-sectional view of the second microphone device cut along the line A-A' in the mobile terminal of FIG. 3 according to an exemplary embodiment of the present invention, and FIG. 5 is a cross-sectional view of the second microphone device cut along the line B-B' in the second microphone device of FIG. 4 according to an exemplary embodiment of the present invention.

Referring to FIG. 3 through FIG. 5, a second microphone device 200 of a mobile terminal 201 includes an ear jack connector 210, a microphone hole 220, and a second microphone 230.

The ear jack connector 210 has an ear jack plug 211, a housing 212, and a contact terminal 213. The ear jack plug 211 fixes an earphone plug (not shown), and electrically connects a terminal of the earphone plug and the contact terminal 213 of the ear jack connector 210. The ear jack plug 211 has an insertion space 215 into which the earphone plug, passing through an insertion hole 214, is inserted. The housing 212 fixes the ear jack plug 211 and the contact terminal 213, and protects them from the outside. In an exemplary implementation, the housing 212 is formed by molding. The contact terminal 213 electrically connects the ear jack plug 211 and a terminal (not shown) of a Printed Circuit Board (PCB) 260.

The microphone hole 220 is a hole through which ambient noise is received and transferred to the second microphone 230. The microphone hole 220 is connected at one end to the insertion space 215 of the ear jack plug 211, and at the other end to a sound reception portion 231 of the second microphone 230. The microphone hole 220 may be formed by a tube 221 that passes through holes formed in the ear jack plug 211 and the housing 212 and is connected to the second microphone 230, as shown in FIG. 4, or may be formed by only a hole passing through the ear jack plug 211 and the housing 212.

The second microphone 230 is a component that receives ambient noise through the microphone hole 220, transforms it to an electrical signal, and transfers the electrical signal to a controller (not shown). A soundproof member 240 is formed on an outer surface of the second microphone 230 except at the sound reception portion 231. The soundproof member 240 prevents noise that is generated inside the mobile terminal from being transferred to the second microphone 230. In an exemplary implementation, the soundproof member 240 may be formed of rubber. An outer surface of the second microphone 230 on which the sound reception portion 231 is formed is surrounded by the soundproof member 240 except at the sound reception portion 231, and is attached to the ear jack connector 210 by the soundproof member 240 between the surface of the second microphone 230 and the ear jack connector 210. Additionally, the second microphone 230 is mounted on the PCB 260, on which the ear jack connector 210 is also mounted. A terminal 250 of the second microphone 230 protrudes from the second microphone 230 towards a mounting surface 261 of the PCB 260, and is connected to a terminal (not shown) of the PCB 260. In this exemplary embodiment of the present invention, the second microphone 230 operates during a receiver communication mode. Therefore, because the earphone plug is removed from the ear jack plug 211 in the receiver communication mode, a passage through which ambient noise may enter is secured for the second microphone 230.

According to an exemplary embodiment of the present invention, the microphone hole 220 of the second microphone 230 is connected to the insertion space 215 into which an earphone plug is inserted. Therefore, the appearance of the mobile terminal 201 is not impaired because the microphone hole 220 does not appear at the outside of the mobile terminal 201. Additionally, in comparison with the related art in which a second microphone device is embodied using a receiver hole 203, removal of ambient noise may be improved because a part of the body of a user does not block a passage through which ambient noise enters.

Additionally, the microphone hole 220 is not directly connected to the outside of the mobile terminal 201, but is indirectly connected to the outside of the mobile terminal 201 through the insertion space 215 of the ear jack plug 211. Therefore, in comparison with a mobile terminal of the related art, influx of foreign material to the second microphone 230 may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
 a connector, including an end wall and a sidewall, forming a cavity in which at least one portion of an external device is to be inserted, the sidewall including an opening formed therein; and
 an acoustic module acoustically coupled with the cavity and configured to be activated if the at least one portion is not inserted in the cavity, and to be deactivated if the at least one portion is inserted in the cavity,
 wherein the cavity and the opening are to be used as a passage to deliver an acoustic signal between the acoustic module and an exterior of the apparatus, and
 wherein the acoustic module is to receive an acoustic signal based at least in part on a determination that the at least one portion is not inserted in the cavity.

2. The apparatus of claim 1, wherein the acoustic module is to provide the acoustic signal to a controller operatively coupled with the acoustic module to reduce ambient noise.

3. The apparatus of claim 1, wherein the acoustic module is to be activated or deactivate based at least in part on a determination that an operation of the apparatus falls into a specified mode.

4. The apparatus of claim 3, wherein the specified mode comprises a communication mode.

5. The apparatus of claim 1, wherein the acoustic module is mounted on a printed circuit board.

* * * * *